United States Patent
Steiner et al.

(10) Patent No.: US 6,421,605 B1
(45) Date of Patent: Jul. 16, 2002

(54) METHOD AND SYSTEM FOR COMPUTER-SUPPORTED DETERMINATION OF A ROUTE FROM A STARTING POINT TO A DESTINATION POINT

(75) Inventors: Donald Steiner, Kaiserslautern; Hartmut Dieterich, München; Alastair Burt, Kaiserslautern; Jürgen Lind, Saarbrücken, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/529,785
(22) PCT Filed: Sep. 30, 1998
(86) PCT No.: PCT/DE98/02891
§ 371 (c)(1),
(2), (4) Date: Apr. 19, 2000
(87) PCT Pub. No.: WO99/20981
PCT Pub. Date: Apr. 29, 2000

(30) Foreign Application Priority Data

Oct. 21, 1997 (DE) .......................... 197 46 471

(51) Int. Cl.$^7$ ............................................. G01C 21/20
(52) U.S. Cl. ..................................... 701/209; 701/201
(58) Field of Search ................................ 701/201, 202, 701/206, 209, 210

(56) References Cited

U.S. PATENT DOCUMENTS

| | | | | |
|---|---|---|---|---|
| 5,170,353 A | * | 12/1992 | Verstraete ................... | 701/202 |
| 5,272,638 A | * | 12/1993 | Martin et al. ................ | 455/456 |
| 5,502,640 A | * | 3/1996 | Yagyu et al. ................ | 701/200 |
| 5,752,217 A | * | 5/1998 | Ishizaki et al .............. | 701/201 |
| 5,845,228 A | * | 12/1998 | Uekawa et al. .............. | 701/209 |
| 5,893,081 A | * | 4/1999 | Poppen ........................ | 705/400 |
| 6,014,607 A | * | 1/2000 | Yagyu et al. ................ | 701/202 |

FOREIGN PATENT DOCUMENTS

| EP | 0 547 548 A1 | | 6/1993 |
|---|---|---|---|
| JP | 63286909 | * | 11/1988 |

OTHER PUBLICATIONS

Shortest paths Algorithms: Theory and Experimental Evaluation, Boris Cherkassky, Aug. 1993.

Personal Dynamic Maps Based on Distributed Geographic Information Servers, Arikawa, pp. 591–596, Aug. 1994.

* cited by examiner

Primary Examiner—Michael J. Zanelli
Assistant Examiner—Eric M. Gibson
(74) Attorney, Agent, or Firm—Bell, Boyd & Lloyd LLC

(57) ABSTRACT

In an iterative method and system, a route is determined from a starting point to a destination point. Sub-modules are supplied with digital messages that respectively contain at least one sub-starting point and one sub-destination point that are contained in a sub-route map that is allocated to the respective sub-module that receives the respective message. Each sub-module determines a sub-route between the respective sub-starting point and the respective sub-destination point. The route is formed from the sub-route.

16 Claims, 2 Drawing Sheets

2

METHOD AND SYSTEM FOR COMPUTER-SUPPORTED DETERMINATION OF A ROUTE FROM A STARTING POINT TO A DESTINATION POINT

BACKGROUND OF THE INVENTION

1. Field of the Invention

The present invention relates to a method and system for the computer-supported determination of a route from a starting point to a destination point wherein the route is determined from a plurality of sub-routes which, in turn, are determined from a plurality of sub-modules respectively associated with the starting point and destination point.

2. Description of the Prior Art

The invention is directed to the determination of a route from a starting point to a destination point.

What is of concern in computer-supported route planning systems is to determine a route between a prescribable starting point, i.e. a departure location at which a user of the route planning system would like to begin a trip, and a destination point to which the user would like to travel. Such determination should be done in such a way that the determination of the route itself occurs as quickly as possible and the route is optimized in view of various, prescribable requirements. Requirements in this sense can be, for example, a travel time required for the overall route, the route length, or specific particulars with regard to specific means of transportation which are preferably are to be utilized.

What is to be understood below by a route is a path description, i.e. a set of nodes and edges, when the path is represented by a graph that includes such nodes and edges, from a starting point to a destination point. The determination of the route should be implemented optimally quickly and flexibly. An overview of methods for determining shortest paths can be found, for example, in B. V. Cherkassky et al., Shortest Path Algorithms, Theory and Experimental Evaluation Mathematical Programming, Vol. 73, No. 2, pp. 129–174, 1993.

SUMMARY OF THE INVENTION

B. V. Cherkassky et al, Shortest Path Algorithms, Theory and Experimental Evaluation Mathematical Programming, Vol. 73, No. 2, pp. 129–174, 1996.

In accordance with the teachings of the present invention, therefore, the route from a starting point to a destination point is determined in an iterative method. The starting point and the destination point lie in different sub-route maps, wherein the sub-route maps are stored in digital form. The method includes the following steps:

sub-modules that are respectively allocated to a sub-route map are supplied with digital messages that respectively contain at least one sub-starting point and at least one sub-destination point that lie in the sub-route map of the sub-module that receives the respective message;

each sub-module determines at least one sub-route between the respective sub-starting point and the sub-destination point; and the route is formed from the sub-route.

The system includes a processor unit that is configured such that a route from a starting point to a destination point that respectively lie in different sub-route maps is determined in an iterative method, wherein the sub-route maps are stored in digital form. The system includes the following:

sub-modules that are respectively allocated to a sub-route map which are supplied with digital messages that respectively contain at least one sub-starting point and at least one sub-destination point that lie in the sub-route map of the sub-module that receives the respective message;

at least one sub-route between the respective sub-starting point and the sub-destination point which is determined by each sub-module; and the route which is formed from the sub-routes.

The present invention assures a fast, flexible determination of a route for a user from a prescribable starting point to a prescribable destination point (at a prescribable point in time). The extremely complex problem of route determination is thereby split into sub-problems that are respectively solved independently of one another. As a result a it becomes possible to consider both central and local knowledge in secondary conditions of determining sub-routes or, respectively, the route.

It is advantageous in one development of the present invention that the sub-route maps are stored in the form of sub-route graphs having nodes and edges, wherein a method for determining shortest paths is respectively utilized for the determination of the sub-route. By utilizing the methodology of determining shortest paths, it is possible to form optimized sub-routes in view of the prescribable optimization criteria in the individual sub-modules in a simple way. The use of methods for determining shortest paths is to be understood such that a respective sub-route is determined optimized in view of a predetermined cost function (optimization criteria). Respective cost values that correspond to the predetermined optimization criterion are allocated to the edges.

Prescribable optimization criteria also can be, for example, the minimization of turning events, particularly left-turn events in cities, in addition to the path length or the duration of a route. Further, the point in time for which the route is to be planned can be taken into consideration in the present invention. Thus, for example, the time of the trip definitely can be of significance since the decision of selecting individual transportation or public transportation for the route can be dependent on the selected point in time (during rush hour one will presumably need more time with an automobile in a central city than given employment of public transportation; the situation might be exactly opposite at night).

An exemplary embodiment of the present invention is shown in the Figures and is explained in greater detail below.

DETAILED DESCRIPTION OF THE PREFERRED EMBODIMENTS

Figure 1:
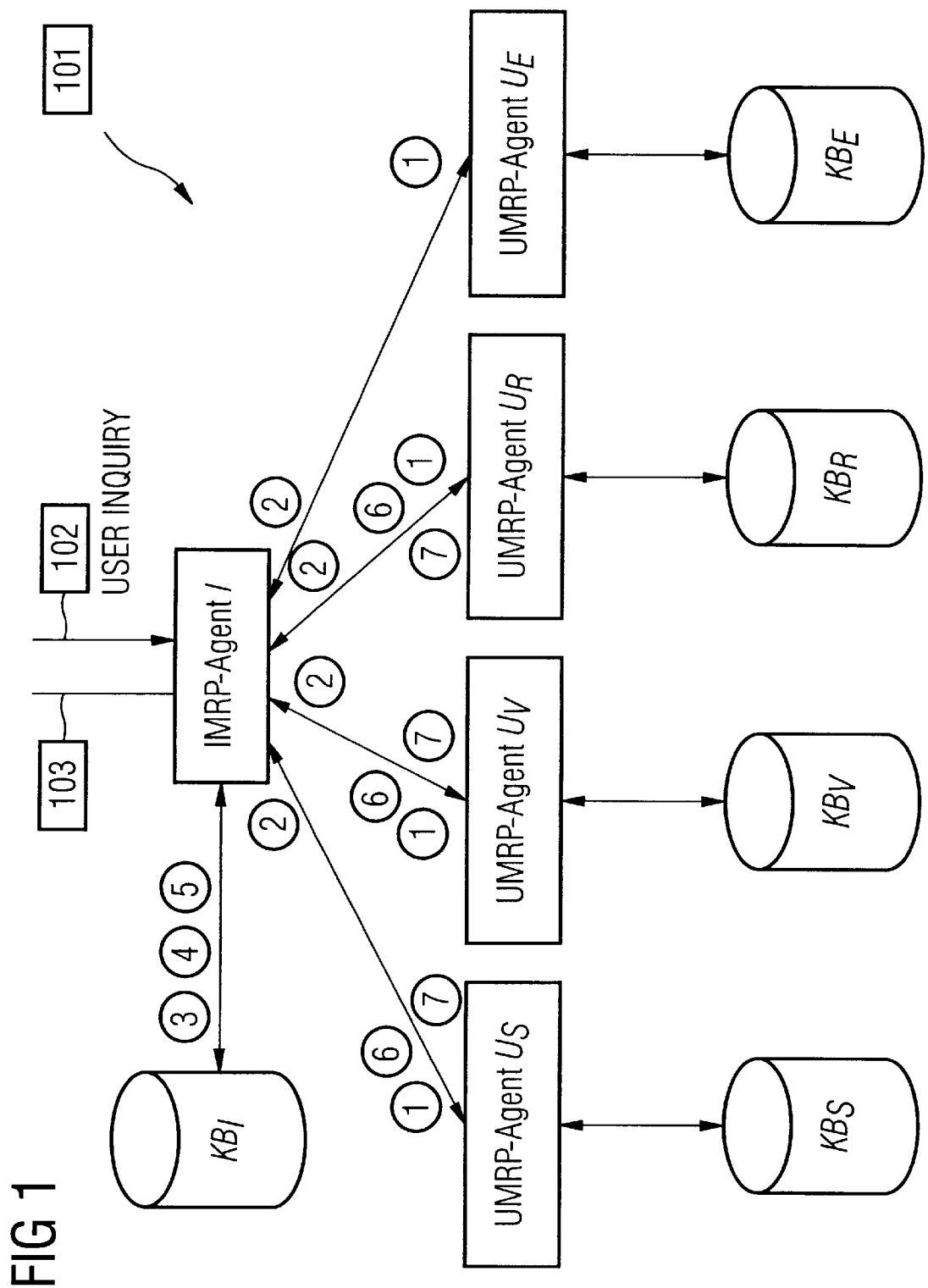
FIG. 1 shows a block diagram that describes the system of the present inventioin as well as the exchange of messages between the software agents.
Figure 2:
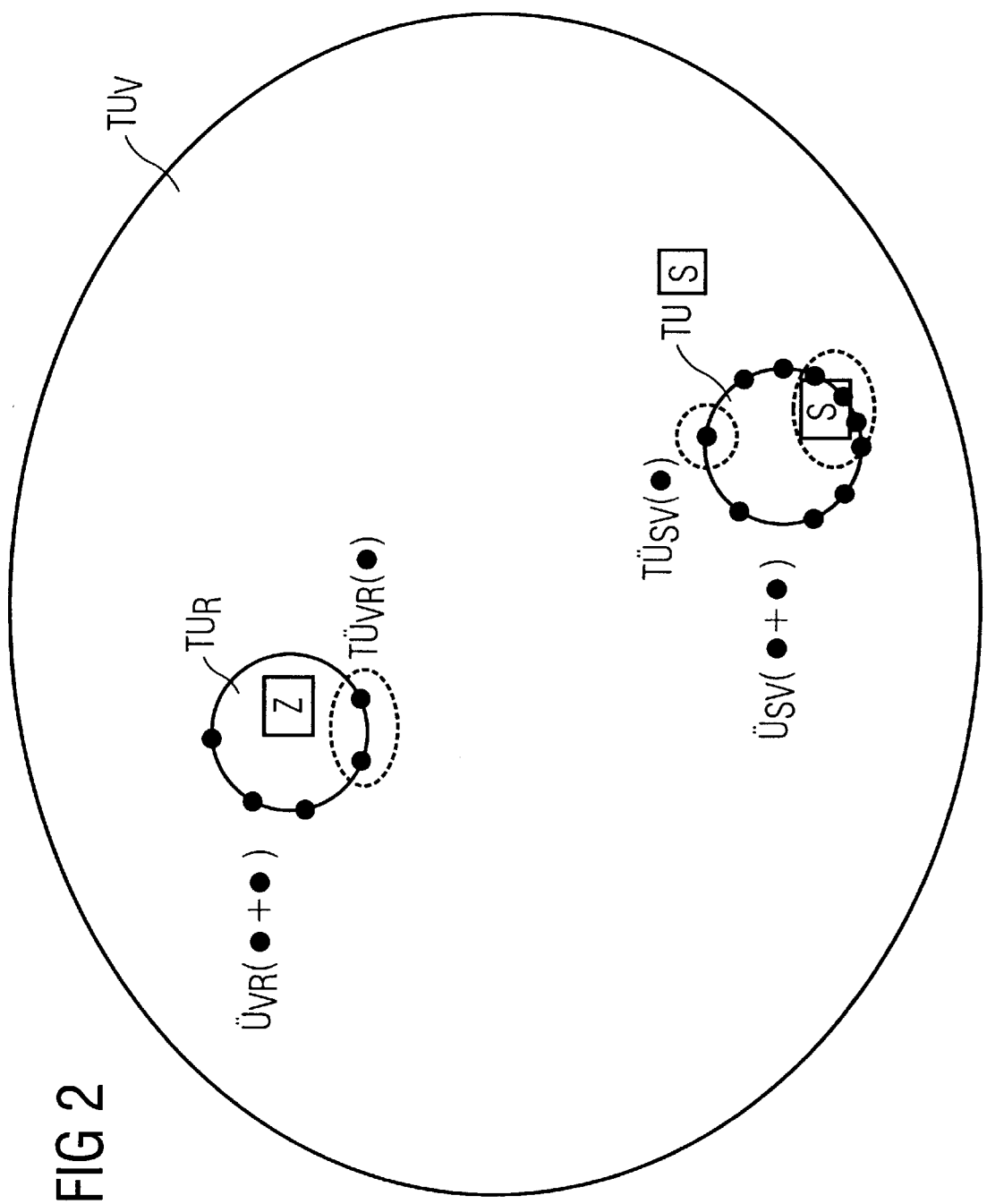
FIG. 2 shows a diagram of a plurality of sub-route maps, by which the method of the present invention may be described.

An system 101 for determining a route on the basis of a user inquiry 102 that is supplied to the system 101 includes the following components:

A plurality of software agents. What is to be understood by a software agent is a program for a data processing system that, on the basis of internal destination rules, is in the position of independently solving the task confronting it without further influence from the outside. A software agent is referred to below as agent.

The determination of routes is implemented and coordinated in a central agent. It is assumed in this exemplary embodiment that various maps and traffic networks in the form of a graph with nodes and edges are stored in the system 101. For example, a traffic and network is to be understood as being a real network.

Schedules of a public transportation network can be allocated, for example, to the traffic networks. These likewise are stored in digital form.

A number of sub-modules are provided in the system 101. A sub-route map is allocated to each sub-module. For example, a sub-route map is a traffic network that covers at least a part of the overall geographical region taken into consideration by the system. The sub-route maps may contain different geographical regions or overlapping geographical regions as well, wherein different traffic networks (streetcar network, bus network, railroad network) can be contained in the sub-route maps in this case.

Each sub-module that is embodied as a software agent is configured such that at least one sub-route is determined upon employment of methods for determining shortest paths in the sub-route map that is allocated to the respective sub-module. A sub-destination point and a sub-starting point that lie at the edge of the sub-route map as well as the route within the sub-route map that leads from the sub-starting point to the sub-destination point are respective results of the sub-route.

The method for determining the route from sub-routes is described in detail below. It is also assumed that a first sub-module $U_S$ is allocated to a first subroute map $TU_S$ that contains a street network for individual transportation in the city of Munich, for example. What is to be understood by individual transportation below is transportation upon employment of motor vehicles or bicycles. A second sub-module $U_V$ is allocated to a second sub-route map $TU_V$ that contains the road network of the Bavarian expressways and highways stored digitally in the form of a graph. A third sub-module $U_R$ is allocated to a third sub-route map $TU_R$ that describes a road network for individual transportation of the Metropolitan area of Nuremberg-Erlangen-Fürth. A fourth sub-module $U_E$ is allocated to a fourth sub-route map $DU_E$ that contains a network wherein all public transportation (bus, streetcar, rail transportation) in the state of Bavarian is stored.

On the basis of the user inquiry 102 that contains a starting point S and a destination point Z (as well as, optionally, departure or arrival time), the point now is to determine an optimally optimized route, i.e. a set of interconnected nodes and edges, from the starting point S to the destination point Z, wherein the use of different means transportation is possible.

In the exemplary embodiment, it is indicated in the user inquiry 102 that the user would like to make a trip from Otto-Hahn-Ring 6 in Munich (starting point S) to Nüremberg, Flaschenhofstrasse 55 (destination point Z) on Monday, Oct. 6, 1997. The user must have arrived at the destination point Z no later than 10:00 a.m. (secondary condition for determining the route). There are no limitations with respect to the selection of the means of transportation in this exemplary embodiment. The optimization criterion is the time required for the trip.

In a first step, a central agent I determines a set of agents, i.e. sub-modules $U_S$, $U_V$, $U_R$, $U_E$, for the starting point S and the destination point Z, into consideration for the determination of a route between the starting point S and the destination point Z. For this purpose, the central agent I sends a first message 1 to all sub-modules $U_i$ (i=1 ... m, m 32 plurality of sub-modules $U_i$) known to it. The first message 1 contains an inquiry as to whether the starting point S and/or the destination point Z is contained in the sub-route map $TU_S$, $TU_V$, $TU_R$, $TU_E$ of the respective sub-module $U_S$, $U_V$, $U_R$, $U_E$.

All sub-modules $U_S$, $U_V$, $U_R$, $U_E$ send a second message to the central agent I, which contains a reply; i.e., a positive or a negative message.

The starting point S is familiar to the first sub-module $U_S$ and to the fourth sub-module $U_E$; i.e., the starting point S lies in the respective sub-route map $TU_S$, $TU_E$. The destination point Z is familiar to the third sub-module $U_R$ and the fourth sub-module $U_E$; i.e., the destination point Z lies in their respective sub-route map $TU_R$, $TU_E$. The second message 2 from the first sub-module $U_S$, the third sub-module $U_R$ as well as the fourth sub-module $U_E$ that are respectively transmitted to the central agent I contain the information that the respective sub-module $U_S$, $U_R$, $U_E$ is involved in the determination of the route.

The second sub-module $U_V$ contains neither the starting point S nor the destination point Z in the sub-route map allocated. The second sub-module $U_V$ as well as other sub-modules $U_i$ (not shown) that are contained in the system, therefore return a second message 2 in which it is indicated that both the starting point S and the destination point Z are unknown to the sub-module $U_V$, $U_i$; i.e., do not lie in their respective sub-route map $TU_V$, $TU_i$.

When the starting point S or the destination point Z is contained in the respective sub-route map, the second message 2 contains an identification particular with which the starting point S or, respectively, the destination point Z can be unambiguously identified in the sub-route map. In this example, a number of sub-modules $U_S$, $U_R$, $U_E$ are respectively "responsible" for the starting point S or, respectively, destination point Z, since the first submodule $U_S$ and the third sub-module $U_R$ are a matter of sub-modules for determining the routes for individual transportation, whereas the fourth sub-module $U_E$ determines routes for public transportation.

In a further step, the central agent I determines a set of sequences wherein it is indicated which sequences of sub-modules $U_S$, $U_R$, E $U_V$, are taken into consideration in the determination of the route proceeding from starting point S to the destination point Z. To this end, a local knowledge base $KV_I$, in the form of a data bank is employed. This is accessible to the central agent I. Sequences of sub-modules whose sub-routes are successively employed in order to proceed from the starting point S to the destination point Z are stored in the knowledge base for each combination of sub-modules in which a starting point or destination point can lie.

Upon inquiry of the central agent I, the local knowledge base $KB_I$ sends a third message 3 to the central agent I that contains the identified sequences. In this case:

1. $U_S \rightarrow U_V \rightarrow U_R$
2. $U_S \rightarrow U_V \rightarrow U_E$
3. $U_S \rightarrow U_R \rightarrow U_E$
4. $U_S \rightarrow U_E$
5. $U_E$ These sequences are to be understood as described below for Case 1 ($U_S \rightarrow U_V \rightarrow U_R$). The route can be formed as a sequence of the sub-route map $TU_S$ of the first sub-module $U_S$, followed by a sub-route of the sub-route map $TU_V$ of the second sub-module $U_V$ and, at the end, of a sub-route of the sub-route map $TU_R$ of the third sub-module $U_R$. The analogous case applies to Cases 2 through 5 presented above.

In a further step, sub-starting points and sub-destination points of the sub-routes that are formed by the first sub-module $U_S$, the second sub-module $U_V$ and the third sub-module $U_R$ are determined. This clearly means that possible transition points $\ddot{U}_{SV}$, $\ddot{U}_{VR}$ between sub-route maps $TU_S$, $TU_V$, $TU_R$ that are allocated to the individual sub-modules $U_S$, $U_V$, $U_R$ are determined.

A list of all theoretically possible sub-destination points and sub-starting points, being referred to below as transition points $\ddot{U}_{SV}$, $\ddot{U}_{ER}$, for the respective sub-route maps $TU_S$, $TU_V$, $TU_R$ is stored in the knowledge base $KV_I$ of the central agent I. An optimally small number of sub-starting points and sub-destination points is selected from the set of all possible transition points $\ddot{U}_{SV}$, $\ddot{U}_{VR}$, in order to thus keep the number of sub-routes to be determined as low as possible. The selection occurs taking local knowledge into consideration, this entering into a heuristic for determining transition points $\ddot{U}_{SV}$, $\ddot{U}_{VR}$.

According to the heuristic, an attempt is made to cover an optimally great portion of the route upon employment of expressways given an overall distance from the starting point S to the destination point Z of more than 100 km (the straight-line distance from Munich to Nüremberg is more than 100 km). This means that the central agent I searches its knowledge base $KB_I$ for transition points $\ddot{U}_{SV}$, $\ddot{U}_{VR}$ that represent a part of an expressway; i.e., for example, represent an expressway interchange. This clearly means that transition points whose nodes represent locations that are contained in an expressway or lead directly to an expressway are determined between the first sub-route map $TU_S$ and the second sub-route map $TU_V$ or, respectively, the second sub-route map $TU_V$ and the third sub-route map $TU_R$.

In a fourth message 4, the knowledge base $KB_I$ of the central agent I is handed the request for determining the transition points $\ddot{U}_{SV}$, $\ddot{U}_{VR}$. The result, i.e. a set of transition points $\ddot{U}_{SV}$ between the sub-route maps $TU_S$ $TU_V$ of the first sub-module $U_S$ and of the second sub-module $U_V$ and a set of transition points $\ddot{U}_{VR}$ between sub-route maps $TU_V$, $TU_R$ of the second sub-module $U_V$ and of a third sub-module $U_R$, is sent back from the knowledge base $KB_I$ in a firth message 5.

A set of transition points $\ddot{U}_{XY}$ (X, Y ∈ N) between sub-route maps exists in case of a transition from a network for individual transportation to a network for public transportation; in this case, $U_R \rightarrow U_E$, $U_V \rightarrow U_E$ and $U_R \rightarrow U_E$ from a number of parking spaces for motor vehicles that are located in the proximity of a station for a public means of transportation. In case of transition from a network for public transportation and a network for individual transportation, the list is composed of cab stands. In case of transition from a network for individual transportation to an adjoining, further network for individual transportation, the list is composed of predetermined points at which a road respectively changes from one network to the other network.

In a sixth message 6 that is sent from the central agent I to the first sub-module $U_S$, to the second sub-module $U_V$ and to the third sub-module $U_R$, the sub-modules $U_S$, $U_V$, $U_R$ are asked whether there are other transition points $\ddot{U}_{SV}$, $\ddot{U}_{VR}$ that are suitable in view of the predetermined optimization criterion by taking into consideration local boundary conditions in a respective local knowledge base $KB_S$, $KB_V$, $KB_R$ that is unambiguously allocated to the respective sub-module $U_S$, $U_V$, $U_R$. Such a local knowledge can be seen therein that, upon employment of the local knowledge base $KB_S$ allocated to it, the first sub-module $U_S$ knows that, on the basis of heuristics and domain-specific knowledge from the local knowledge base $KB_S$, the transition points $\ddot{U}_{SV}$ in the southeast and in the north of the first sub-route map $TU_S$ are to be taken into consideration for a longer trip in a northerly direction from the predetermined starting point S that is located relatively far south in Munich.

It is indicated in the local knowledge $KB_V$ that is allocated to the second sub-module $U_V$, that the transition points $\ddot{U}_{VR}$ of the second sub-route map $TU_V$ of the second sub-module $U_V$ are advantageous for a trip from Munich to Nüremberg, these lying in the north of the second sub-route map $TU_V$. The central agent I determines [ ... ] a sub-set $T\ddot{U}_{SV}$ for transitions from the first sub-route map $TU_S$ and the second sub-route map $TU_V$ from the additional proposals that are supplied to the central agent I by the individual sub-modules $U_S$, $U_V$, $U_R$. Analogously, a second sub-set $T\ddot{U}_{VR}$ of transition points $\ddot{U}_{VR}$ is determined analogously for the transition points $\ddot{U}_{VR}$ that represent transitions between the second sub-route map $TU_V$ and the third sub-route map $TU_R$.

A seventh message is sent from the central agent I to the first sub-module $U_S$, to the second sub-module $U_V$ and to the third sub-module $U_R$. The seventh message S respectively contains an inquiry for determining one or more sub-routes that are optimum in view of the predetermined optimization criterion of time. In this example, the seventh message 7 that is supplied to the first sub-module $U_S$ asks that sub-routes be determined from the starting point S to the five transition points $\ddot{U}_{SV}$ of the first sub-set $T\ddot{U}_{SV}$. The seventh message 7 that is supplied to the second sub-module $U_V$ contains an inquiry for determining sub-routes of all combinations between the transition points $\ddot{U}_{SV}$ of the first sub-set $TU_{SV}$ and the transition points $\ddot{U}_{VR}$ of the second subset $T\ddot{U}_{VR}$. The seventh message 7 that is supplied to the third sub-module $U_R$ contains an inquiry for determining sub-routes from the two transition points $\ddot{U}_{VR}$ of the second sub-set $T\ddot{U}_{VR}$ to the destination points Z.

The total number of sub-routes to be determined amounts to 5+10+2=17 given this procedure. Given determination of all possible sub-routes for all transition points $\ddot{U}_{VS}$, $\ddot{U}_{VR}$ of the sub-route maps coming into consideration, an order of magnitude of 2000 through 3000 determinations would be required in the present case (proceeding from a total number of possible transition points on the order of magnitude of 50).

The determination of the sub-routes and the sub-modules occurs upon employment of methods for determining shortest paths; for example, the method according to Digkstra. Respective node values are allocated to the respective nodes and/or edges of the sub-route map, these node values being taken into consideration within the framework of the optimization for determining the sub-route within the sub-route map in a cost function. The cost values and the type of consideration depend on the nature of the optimization criterion. Possible optimization criteria are the time required overall for the trip, the overall route length which is to be minimized or further boundary conditions. When, for example, a specific means of transportation is not to be employed, then the respective sub-module that is "responsible" for this means of transportation is not commissioned with the calculation of a sub-route.

After all sub-routes have been supplied to the central agent I from the sub-modules, the central agent I determines a route, whereby the route is a set of interconnected nodes and edges proceeding from the starting point S to the destination node Z. The best route in view of the optimization criterion "time" is selected by the central agent I.

The above-described method for the first sequence $U_S \rightarrow U_V \rightarrow U_R$ is correspondingly implemented for all further sequences. It must be noted, however, that transition times for changing between means of transportation and discrete departure times of the respective public means of transportation must be respectively taken into consideration given transitions between the network for individual transportation and a network for public transportation. This is not required in the transition between networks for individual transportation.

As an overall result, a route that is optimized in view of the optimization criterion is selected. As such, the selected route is made available to the user as reply 103 to his user inquiry 102; for example, being displayed on a picture screen or being output in some other form.

Some alternatives to the above-described exemplary embodiment are set forth below.

In the exemplary embodiment, all significant sub-modules that are required for the determination of the route are known to the central agent I. In one version, however, it is provided that the information about required sub-modules is stored in further agents. The information is then interrogated by the central agent I.

In one version, the case can occur for the sequences 2 through 5 that the last section of the trip is made with a taxi cab. This means that the sequence must be augmented by the further sub-module $U_R$ (supplementation of the sequences by the post-fix "$\rightarrow U_R$"), since, namely, the last sub-module $U_R$ would not have to identify the exact route to the destination point Z but would have to identify the time required for the last sub-section.

Although the present invention has been described with reference to specific embodiments, those of skill in the art will recognize that changes may be made thereto without departing from the spirit and scope of the invention as set forth in the hereafter appended claims.

We claim as our invention:

1. A method for computer-supported determination of a route from a starting point to a destination point that respectively lie in different sub-route maps, the method comprising the steps of:
    storing the sub-route maps in digital form;
    allocating respective sub-modules to respective sub-route maps;
    supplying the sub-modules with digital messages that respectively contain at least a sub-starting point and at least a sub-destination point that lie in the sub-route map of the sub-module that receives the respective digital message;
    determining at least one sub-route, via the respective sub-module, between the respective sub-starting point and the sub-destination point; and
    forming the route from the sub-routes.

2. A method for computer-supported determination of a route from a starting point to a destination point as claimed in claim 1, wherein the sub-route maps are stored in the form of sub-route graphs with nodes and edges.

3. A method for computer-supported determination of a route from a starting point to a destination point as claimed in claim 2, wherein the route is a set of interconnected nodes and edges between the starting point and the destination point.

4. A method for computer-supported determination of a route from a starting point to a destination point as claimed in claim 1, further comprising the step of:
    storing a data bank, on the basis of which possible chainings of sub-modules are determined, in a central module.

5. A method for computer-supported determination of a route from a starting point to a destination point as claimed in claim 1, wherein the sub-modules are software agents.

6. A method for computer-supported determination of a route from a starting point to a destination point as claimed in claim 1, further comprising the step of:
    storing a sub-data bank in each sub-module, wherein at least one optimized route in the sub-module is determined with reference to the sub-data bank.

7. A method for computer-supported determination of a route from a starting point to a destination point as claimed in claim 1, wherein the step of determining at least one sub-route includes determining shortest paths in the sub-route map allocated to the respective sub-module.

8. A method for computer-supported determination of a route from a starting point to a destination point as claimed in claim 1, wherein the determination of the sub-route occurs such that the sub-route is optimized in view of a cost function.

9. A system for computer-supported determination of a route from a starting point to a destination point that respectively lie in different sub-route maps, wherein the sub-route maps are stored in digital form, the system including at least one processor unit which comprises a plurality of sub-modules that are respectively allocated to a sub-route map, wherein each of the plurality of sub-modules are supplied with a digital message that respectively contains at least a sub-starting point and a sub-destination point that lie in the sub-route map of the respective sub-module that receives the respective digital message, wherein each sub-module determines at least one sub-route between the respective sub-starting point and the sub-destination point, and wherein the route is formed from the plurality of sub-routes.

10. A system for computer-supported determination of a route from a starting point to a destination point as claimed in claim 9, wherein the processor unit is configured such that the sub-route maps are stored in the form of sub-route graphs which nodes and edges.

11. A system for computer-supported determination of a route from a starting point to a destination point as claimed in claim 10, wherein the processor unit is configured such that the route is a set of interconnected nodes and edges between the starting point and the destination point.

12. A system for computer-supported determination of a route from a starting point to a destination point as claimed in claim 9, the system further comprising:
    a central module; and
    a data bank with reference to which possible chainings of sub-modules are determined which is stored in the central module.

13. A system for computer-supported determination of a route from a starting point to a destination point as claimed in claim 9, wherein the processor unit is configured such that the sub-modules are software agents.

14. A system for computer-supported determination of a route from a starting point to a destination point as claimed in claim 9, wherein the processor unit is configured such that a sub-data bank with reference to which at least one optimized route in the sub-module is determined is stored in each sub-module.

15. A system for computer-supported determination of a route from a starting point to a destination point as claimed in claim 9, wherein the processor unit is configured such that the determination of the at least one sub-route includes a determination of shortest paths in the sub-route map allocated to the respective sub-module.

16. A system for computer-supported determination of a route from a starting point to a destination point as claimed in claim 9, wherein the processor unit is configured such that the determination of the sub-route occurs such that the sub-route is optimized in view of a cost function.

* * * * *